United States Patent
Seela et al.

(10) Patent No.: US 9,983,942 B1
(45) Date of Patent: May 29, 2018

(54) CREATING CONSISTENT USER SNAPS AT DESTINATION DURING REPLICATION

(71) Applicant: EMC Corporation, Hopkinton, MA (US)

(72) Inventors: Nagapraveen V. Seela, Cary, NC (US); Michael C. Brundage, Cary, NC (US); Yan Xu, Boston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 14/644,475

(22) Filed: Mar. 11, 2015

(51) Int. Cl.
*G06F 11/14* (2006.01)
*G06F 11/20* (2006.01)

(52) U.S. Cl.
CPC ...... *G06F 11/1451* (2013.01); *G06F 11/1435* (2013.01); *G06F 11/2058* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,631,155 B1 | 12/2009 | Bono et al. | |
| 7,769,722 B1 | 8/2010 | Bergant et al. | |
| 8,706,833 B1 | 4/2014 | Bergant et al. | |
| 9,286,007 B1 | 3/2016 | Bono | |
| 2007/0185973 A1 | 8/2007 | Wayda et al. | |
| 2012/0158659 A1* | 6/2012 | Marathe | G06F 17/30997 707/639 |
| 2014/0081911 A1* | 3/2014 | Deshpande | G06F 11/1448 707/610 |

OTHER PUBLICATIONS

"EMC Celerra Replicator—Advanced IP Storage Protection", (PowerPoint Presentation), EMC Corporation, EMC Corporation, Hopkinton, MA, 2008, 27 pages.
"EMC RecoverPoint Family", (Data Sheet H2769), EMC Corporation, EMC Corporation, Hopkinton, MA, Aug. 2013, 6 pages.
"EMC VNX Snapshots", (White Paper), EMC Corporation, EMC Corporation, Hopkinton, MA, Dec. 2013, 57 pages.

* cited by examiner

*Primary Examiner* — Tracy Chan
(74) *Attorney, Agent, or Firm* — BainwoodHuang

(57) ABSTRACT

A technique for providing access to a data object serving as a target of snapshot-shipping replication includes taking a system snap of the data object after completion of each of multiple snapshot-shipping updates. In response to receiving a request to take a user snap of the data object, a data storage system redirects the request to a previously generated system snap, so that the data storage system takes the user snap of the system snap rather than taking the user snap of the data object itself.

17 Claims, 6 Drawing Sheets

CREATING CONSISTENT USER SNAPS AT DESTINATION DURING REPLICATION

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly employ snapshot-shipping replication for protecting the data they store. A well-known snapshot-shipping solution is the Celerra Replicator™ V2, which is available from EMC Corporation of Hopkinton, Mass. Replicator V2 operates by taking snaps (i.e., point-in-time versions) of data objects at a source data storage system, identifying differences between current snaps and previous snaps, and sending the differences to a destination data storage system. The destination receives the differences and applies them to corresponding objects maintained locally, to update the objects with changes that mirror those made to the respective objects at the source. The objects at the destination may thus be regarded as replicas of the objects at the source, and the role of serving the objects to hosts may failover from source to destination in the event of a loss of service at the source.

SUMMARY

When using a snapshot-shipping session to replicate an active production version of a data object from a source to a destination, the destination typically receives snapshot-shipping updates on a regular basis and/or in response to particular events, to keep the version of the data object at the destination approximately current with the active production version at the source. For example, a replication session may update the data object at the destination as needed to meet desired settings for RPO (recovery point objective) and/or RTO (recovery time objective).

Sometimes, an administrator or other user may wish to perform a DR (Disaster Recovery) testing procedure and/or other activities on a data object stored on a destination. For example, the administrator may mount the data object and read and/or write to the data object to verify that it can serve as a reliable target of failover in the event that something goes wrong at the source. Because the data object may regularly receive snapshot-shipping updates, however, there is no guarantee that the data object will remain in a consistent state throughout the DR testing. Changes in the data object during the course of DR testing may cause the data object to appear corrupted, which may lead the administrator to conclude improperly that DR testing has failed. To avoid having the data object change during the course of DR testing, a prior approach involves the administrator taking a user snap of the data object. The administrator can then perform DR testing on the user snap, rather than on the data object directly. The user snap remains consistent throughout the DR testing, even in the face of changes in the data object as new updates arrive.

Unfortunately, this prior approach of taking a user snap of the replica still leaves room for inconsistencies if the administrator requests the user snap while a snapshot-shipping update is in progress. A user snap might then be taken of the replica in its course of being updated, such that the user snap reflects an inconsistent state of the replica. To avoid this outcome, the administrator must typically pause the replication session before taking the user snap. The administrator may then resume the replication session once the user snap has been taken. This need to pause and resume the replication session imposes additional burdens on the administrator. It also introduces a risk that desired settings for RPO/RTO will fail to be met, as a replication session that has been paused cannot be relied upon the meet replication objectives.

In contrast with this prior approach, an improved technique for providing access to a data object serving as a target of snapshot-shipping replication includes taking a system snap of the data object after completion of each of multiple snapshot-shipping updates. In response to receiving a request to take a user snap of the data object, e.g., as a prelude to performing DR testing, a data storage system redirects the request for the user snap to a previously generated system snap, so that the data storage system takes the user snap of the system snap rather than of the data object itself. As the system snap remains consistent during snapshot-shipping updates to the data object, the user snap of the system snap necessarily also remain consistent. Advantageously, generating user snaps from system snaps does not require pausing replication sessions, as a stable system snap is made available as the source for snapping, regardless of the state of the data object. As the need to pause and resume replication sessions is avoided, the improved technique reduces the number of activities the administrator must perform to carry out DR testing. The improved technique also avoids the risk that the replication session will fail to meet RPO/RTO targets.

In some examples, redirection of user snap requests is performed selectively, based on whether any snapshot-shipping update is in progress when a request for the user snap is received. For example, if a data storage system receives a request to take a user snap when no snapshot-shipping update is in progress, the data storage system may take the user snap of the data object directly, rather than taking the user snap of a system snap. However, if the data storage system receives a request to take a user snap when a snapshot-shipping update is currently in progress, the data storage system may take the user snap of the system snap.

Certain embodiments are directed to a method for generating snaps in a data storage system. The method includes performing, at a destination data storage system, multiple snapshot-shipping updates to a data object. Each snapshot-shipping update applies a set of changes to the data object to bring the data object into a state that is content-consistent with that of a source object operated from a source data storage system. The snapshot-shipping updates are performed at respective times to keep the data object substantially current with the source object as the source object changes over time. After performing each snapshot-shipping update to the data object and before performing another one, the method further includes generating a system snap of the data object, each system snap providing a point-in-time version of the data object that reflects a state of the data object after completion of the respective snapshot-shipping update. Upon receiving a request to generate a user snap of the data object, the method still further includes generating the user snap of the data object as a snap of a previously generated system snap.

Other embodiments are directed to a data storage system constructed and arranged to perform a method for generating snaps in a data storage system, such as the one described above. Still other embodiments are directed to a computer program product. The computer program product stores instructions which, when executed on a set of processing units of a destination data storage apparatus, cause the set of processing units to perform a method for generating snaps in a data storage system, such as that described above. Some embodiments may involve activity that is performed at a single location, while other embodiments may involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for providing access to a data object serving as a target of snapshot-shipping replication includes taking a system snap of the data object after completion of each of multiple snapshot-shipping updates. In response to receiving a request to take a user snap of the data object, a data storage system redirects the request to a previously generated system snap, so that the data storage system takes the user snap of the system snap rather than taking the user snap of the data object itself.

Figure 1:
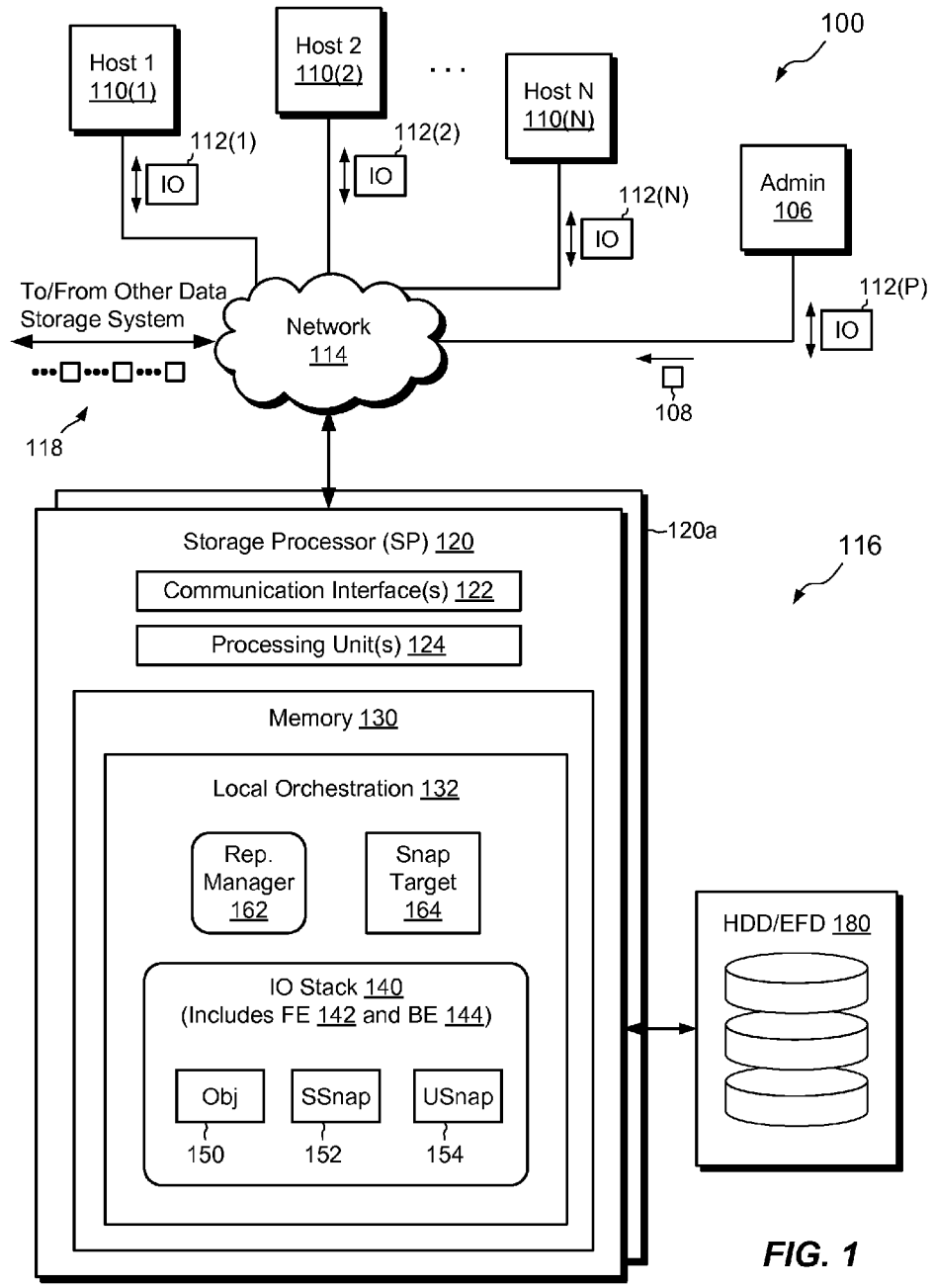
FIG. 1 is a block diagram showing an example environment in which improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of magnetic disk drives, electronic flash drives, and/or optical drives, for example. The data storage system 116 may include multiple SPs like the SP 120 (e.g., a second SP, 120a). In an example, multiple SPs may be provided as circuit board assemblies, or "blades," which plug into a chassis, which encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

Although FIG. 1 shows only a single data storage system 116, it is understood that some operations described herein involve activities that take place between two data storage systems, e.g., between a source data storage system (source) and a destination data storage system (destination). The source and destination may be connected via the network 114 or via any suitable means. The particular construction shown for the data storage system 116 is intended to be representative of both the source and the destination, although it should be understood that the source and the destination may be allowed to vary in their particular details.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. In some examples, the SP 120 is configured to receive IO requests 112(1-N) according to both block-based and file-based protocols and to respond to such IO requests 112(1-N) by reading or writing the storage 180. In other examples, the SP 120 is configured to receive and process IO requests 112(1-N) according to either block-based protocols or file-based protocols, but not according to both.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein, e.g., alone or in coordination with similar control circuitry on another data storage system. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes local orchestration 132, which itself includes an IO stack 140, a replication manager 162, and a data element, identified here as IO target 164. The local orchestration 132 controls and coordinates various software constructs within the memory 130.

The IO stack 140 provides an execution path for host IOs, e.g., for IO requests 112(1-N). In some examples, the IO stack 140 is provided in the form of a separate front end (FE) 142 and back end (BE) 144. The front end 142 runs locally on SP 120. The back end 144 may also run locally on SP 120, or it may run on another SP (e.g., on SP 120a) or on a block-based array connected to SP 120 (e.g., in a gateway configuration). The IO stack 140 provides access to data objects stored in the data storage system 116, such as object 150 ("Obj"), system snap ("SSnap") 152, and user snap ("USnap") 154. System snaps, such as the system snap 152, are generated automatically by the data storage system 116 at predetermined times and/or in response to predetermined events, whereas user snaps, such as user snap 154, are generated manually, e.g., by the data storage system 116 in response to requests received from an administrator, such as a user of administrator machine 106. In an example, the data object 150 is a host-accessible object, such as a LUN (logical unit number), a host file system, or a VVol, for example (VVols are virtual volumes, e.g., available from VMware, Inc. of Palo Alto, Calif.). The snaps 152 and 154 are point-in-time versions of the data object, or point-in-time versions of other snaps of the data object, and are mountable or otherwise accessible the same way as is the data object. In some implementations, system snaps, like the snap 152, are hidden from hosts but remain available to internal processes running on the data storage system 116 and/or to administrators.

The replication manager 162 controls replication settings and operations for specified data objects. In an example, the replication manager 162 establishes replication settings on a per-data-object basis, conducts replication sessions, and orchestrates replication activities, including recovery and failover. For instance, the replication manager 162 establishes and controls snapshot-shipping replication for the data object 150. Although FIG. 1 shows only a single data object 150 and snaps 152 and 154, it should be understood that the data storage system 116 may store any number of data objects and any number of snaps of those data objects, and may provide host access to such data objects simultaneously. The replication manager 162 may establish and control replication for any such data objects. The data storage system 116 may act as a replication source for some data objects and as a replication destination for others.

The snap target 164 identifies particular versions of data objects to be used as sources for user snaps. For example, the data storage system 116 may store a primary version of a data object, such as data object 150, and may store any number of secondary versions of the data object, such as system snap 152. In such cases, the snap target 164 identifies a single version of the data object (e.g., either 150 or 152) to serve as the object to be snapped in response to requests for user snaps. The snap target 164 may store similar version information for other data objects. In an example, the data storage system 116 persists the data stored in the snap target 164, e.g., in the storage 180, such that the snap target 164 may be retained and later restored in the event of a system panic or power failure.

In example operation, the hosts 110(1-N) issue IO requests 112(1-N) to the data storage system 116 for reading and/or writing data objects, such as the data object 150. The SP 120 receives the IO requests 112(1-N) at the communication interfaces 122 and forwards the IO requests 112(1-N) to the IO stack 140 for further processing. In an example, the data storage system 116 internally realizes data objects as respective container files in a set of internal, container file systems accessible from within the IO stack 140, and employs mapping to express the container files as respective host-accessible objects. For example, upon receiving the IO requests, the front end 142 maps the IO requests to internal, block-based requests directed to internal volumes. The front end 142 further maps the internal volumes to respective container files. The IO stack 140 thus converts incoming host IO requests into corresponding requests to container files. As will be described infra, the front end 142 may perform snapshot-shipping replication at the level of these container files, using container files as sources and/or targets of snapshot-shipping operations. After processing by the front end 142, the IO requests propagate to the back end 144, and the back end 144 executes commands for reading and/or writing the physical storage 180.

For descriptive purposes, it is now assumed that the data storage system 116 is configured to act as a destination for snapshot-shipping replication for the data object 150, such that the data object 150 represents a replica of a similar data object hosted from a source data storage system located elsewhere. In an example, the version of the data object at the source (not shown in FIG. 1) is a production version, which hosts actively access such that its contents change over time. As part of an ongoing snapshot-shipping replication session, the data storage system 116 receives, e.g., on a regular basis and/or in response to particular events, snapshot-shipping updates 118 from the source data storage system. Each snapshot-shipping update 118 includes an accumulation of changes since the immediately previous update 118. As the data storage system 116 receives each update 118, the data storage system 116 applies the update to the data object 150, i.e., to implement the changes on the data object 150 and thus to bring the data object 150 into a content-consistent state with the version of the data object at the source. After completing each snapshot-shipping update 118, the data storage system 116 automatically generates a new system snap of the data object 150, such that a fresh system snap reflecting the recently applied changes is made available. Optionally, the data storage system 116 may destroy each previous system snap after taking each new system snap. New snapshot-shipping updates 118 may arrive every few minutes, hours, or days, depending on replication settings and/or on how quickly the version of the data object at the source changes.

Assume now that during this ongoing replication session an administrator on administrator machine 106 issues a request 108 to take a user snap of the data object 150. For example, the administrator may wish to perform DR testing on the data object 150, to verify that the data object 150 can assume the role of the actively-accessed production version of the object in the event of failover from source to destination. Upon receiving the request 108, the data storage system 116 passes the request 108 to local orchestration 132, which interrogates the snap target 164 for the data object 150. The snap target 164 stores an identifier of a proper version of the data object 150 to be used for taking user snaps. For example, the proper version may be the data object 150 itself, or it may be a system snap of the data object 150, such as system snap 152. Once in possession of the identifier specified in the snap target 164, the local orchestration 132 proceeds to take a user snap of the identified object. For example if the snap target 164 stores an identifier of the system snap 152, the local orchestration 132 directs snapping logic to take a snap of the system snap 152 to create the user snap 154. However, if the snap target 164 stores an identifier of the data object 150, the local orchestration 132 directs snapping logic to take a snap of data object 150 to create the user snap 154. The administrator may then mount or otherwise access the user snap 154 and direct IO requests 112(P) to the user snap 154, e.g., to exercise the user snap 154 and thereby to assess its DR preparedness.

In an example, local orchestration 132 establishes the snap target 164 to identify the data object 150 during times between consecutive snapshot-shipping updates 118 but changes the snap target 164 to identify the system snap 152 while snapshot-shipping updates 118 are taking place. This operation ensures that each user snap is always taken of a stable version of the data object. For example, during snapshot-shipping updates 118 the data object 150 changes as the updates are being applied but the system snaps remain stable. Between updates 118, both the data object 150 and the system snaps remain stable. The data object 150 is preferably selected in this case, however, because it provides the most direct view of the object that will be relied upon to become active and host-accessible once failover occurs.

Figure 2:
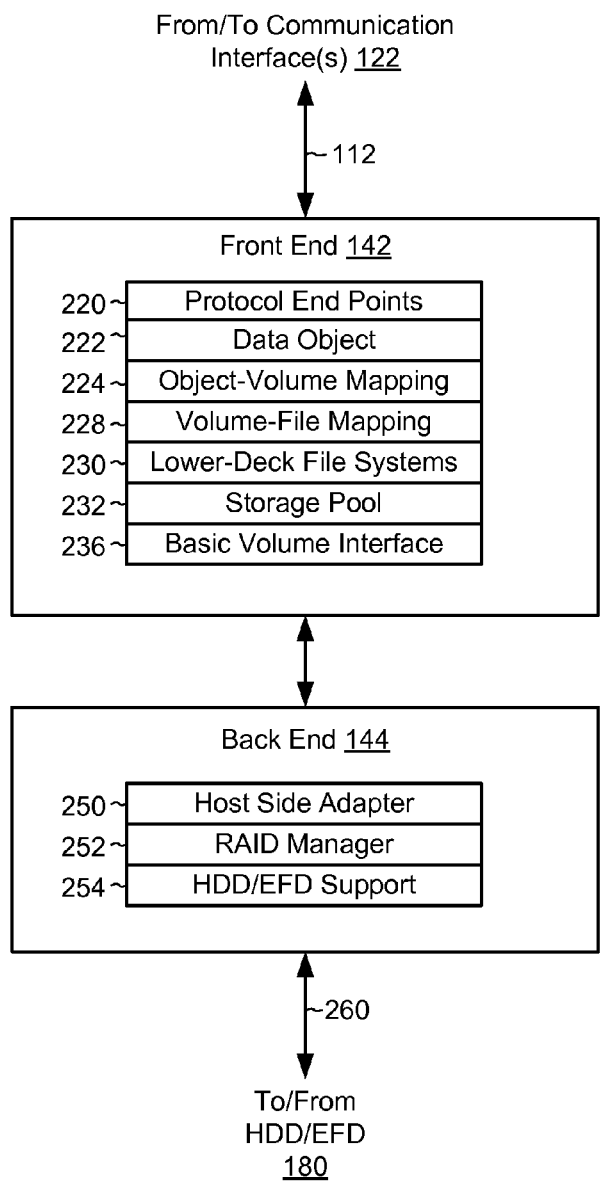
FIG. 2 is a block diagram showing an example IO stack of a storage processor of FIG. 1 in additional detail.

FIG. 2 shows the IO stack 140 in additional detail. Here, the front end 142 is seen to include protocol end points 220, a data object layer 222, an object-volume mapping layer 224, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), the components of the IO stack 140 are described herein from the bottom to the top to facilitate understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups and provides access to the RAID groups using RAID protocols. The host side adapter 250 provides an interface to the front end 142, for implementations in which the front end 142 and back end 144 run on different machines. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 run on different hardware. The basic volume interface 236 may be disabled in the arrangement shown in FIG. 1.

The storage pool 232 organizes elements of the storage 180 into slices. A "slice" is an increment of storage space, such as 256 MB or 1 GB in size, which is derived from the storage 180. The pool 232 may allocate slices to lower-deck file systems 230 to support the storage of data objects. The pool 232 may also de-allocate slices from lower-deck file systems 230 if the storage provided by the slices is no longer required. In an example, the storage pool 232 creates slices by accessing RAID groups formed by the RAID manager 252, expressing the RAID groups as FLUs (Flare LUNs), and dividing the FLU's into slices.

The lower-deck file systems 230 are built upon the slices managed by the storage pool 232 and represent block-based objects and/or file-based objects internally in the form of files (container files). The data storage system 116 may host any number of lower-deck file systems 230, and each lower-deck file system may include any number of files. In a typical arrangement, a different lower-deck file system is provided for each primary data object to be stored. For example, each lower-deck file system includes one file that stores the primary data object (i.e., the production version or replica) and, in some instances, other files that store snaps of the primary file or of other snaps. For instance, and referring briefly back to FIG. 1, the data object 150, system snap 152, and user snap 154 may all reside as respective files within the same lower-deck file system. Each of the lower-deck file systems 230 has an inode table. The inode table provides a different inode for each file stored in the respective lower-deck file system. Each inode stores properties of a respective file, such as its ownership and pointers to block locations within the respective lower-deck file system at which the file's data are stored.

The volume-file mapping 228 maps each file representing a data object to a respective internal volume. Higher levels of the IO stack 140 can then access the internal volume using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting location (logical unit number) and offsets into the volume, the volume-file mapping 228 can establish a one-to-one correspondence between offsets into the file and offsets into the corresponding internal volume, thereby providing the requisite mapping needed to express the file in the form of a volume.

The object-volume mapping layer 224 maps internal volumes to respective host-accessible data objects, such as LUNs, host file systems, and VVols. For LUNs, object-volume mapping may involve a remapping from a format compatible with the internal volume to a format compatible with the LUN. In some examples, no remapping is needed. For host file systems, object-volume mapping leverages the fact that file systems are customarily built upon volumes, such that an underlying volume is part of the structure of any file system. Host file systems, also called "upper-deck file systems," are built upon the internal volumes presented by the volume-file mapping 228 to provide hosts with access to files and directories stored within the host file systems. Mapping of VVols can be achieved in similar ways. For block-based VVols, the object-volume mapping layer 224 may perform mapping substantially as it does for LUNs. For file-based vVOLs, the object-volume mapping layer 224 may convert host-specified offsets into VVol files to corresponding offsets into internal volumes.

The protocol end points 220 expose the underlying data objects to hosts in accordance with respective protocols. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

Figure 3:
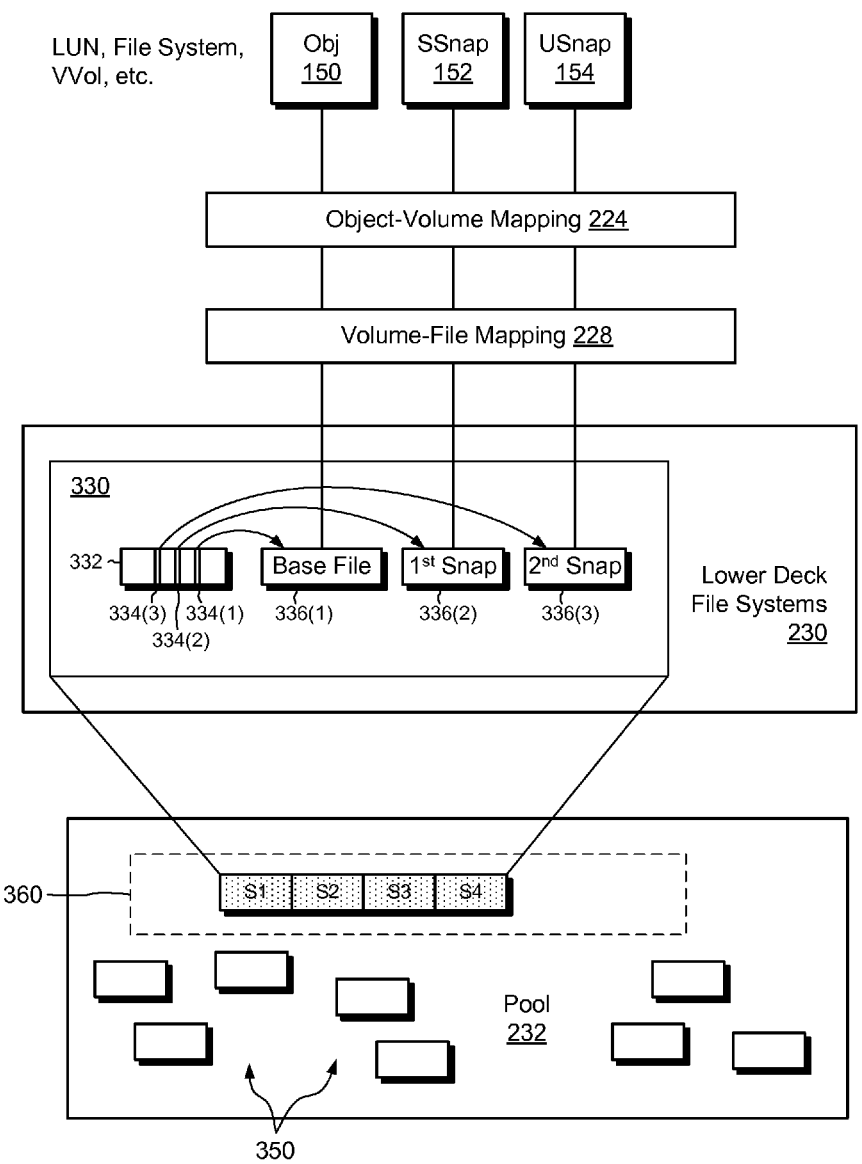
FIG. 3 is a block diagram showing example features of the IO stack of FIG. 2.

FIG. 3 shows portions of the front end 142 in additional detail. Here, the front end 142 is seen to realize the data object 150, system snap 152, and user snap 154 using base file 336(1), first snap file 336(2), and second snap file 336(3), respectively, within a single lower-deck (container) file system 330. The lower-deck file system 330 has an inode table 332, which includes a different inode for each file. For example, the inode table 332 includes an inode 334(1) that describes the base file 336(1), an inode 334(2) that describes the first snap file 336(2), and an inode 334(3) that describes the second snap file 336(3). Volume-file mapping 228 expresses each of the files 336(1) to 336(3) as respective volumes, which may be accessed using block-based semantics, and object-volume mapping 224 expresses each of the volumes as respective host-accessible objects (e.g., LUN, host file system, VVol, etc.). The storage pool 232 provisions slices 360 to the lower-deck file system 330, to support storage of data and metadata for the files 336(1) to 336(3). Other slices 350 are available to be provisioned to the lower-deck file system 330 on demand.

In an example, the first and second snap files 336(2) and 336(3) are point-in-time versions of the base file 336(1). To create each snap of the base file 336(1), the lower-deck file system 330 creates new metadata for the snap but configures the new metadata to point initially to all the same data blocks as does the base file 336(1). Subsequent changes to the base file 336(1) may result in write splits and new block allocations to the base file 336(1), but the data of each snap remains constant. Thus, a snap may initially share all the same data with its base file at the time the snap is taken. Subsequent changes to the base file have no effect on the data of the snap. The snap thus retains a point-in-time version of the base file, even as the base file changes.

Although FIG. 3 shows only one system snap and one user snap, it should be understood that the lower-deck file system 330 may include any number of snaps of either type. In addition, some user snaps may be snaps of the base file, whereas others may be snaps of system snaps. For example, the user snap 154, as realized in file 335(3), may be a snap of either the base file 336(1) or of any system snap, such as the snap realized in file 336(2).

Figure 4:
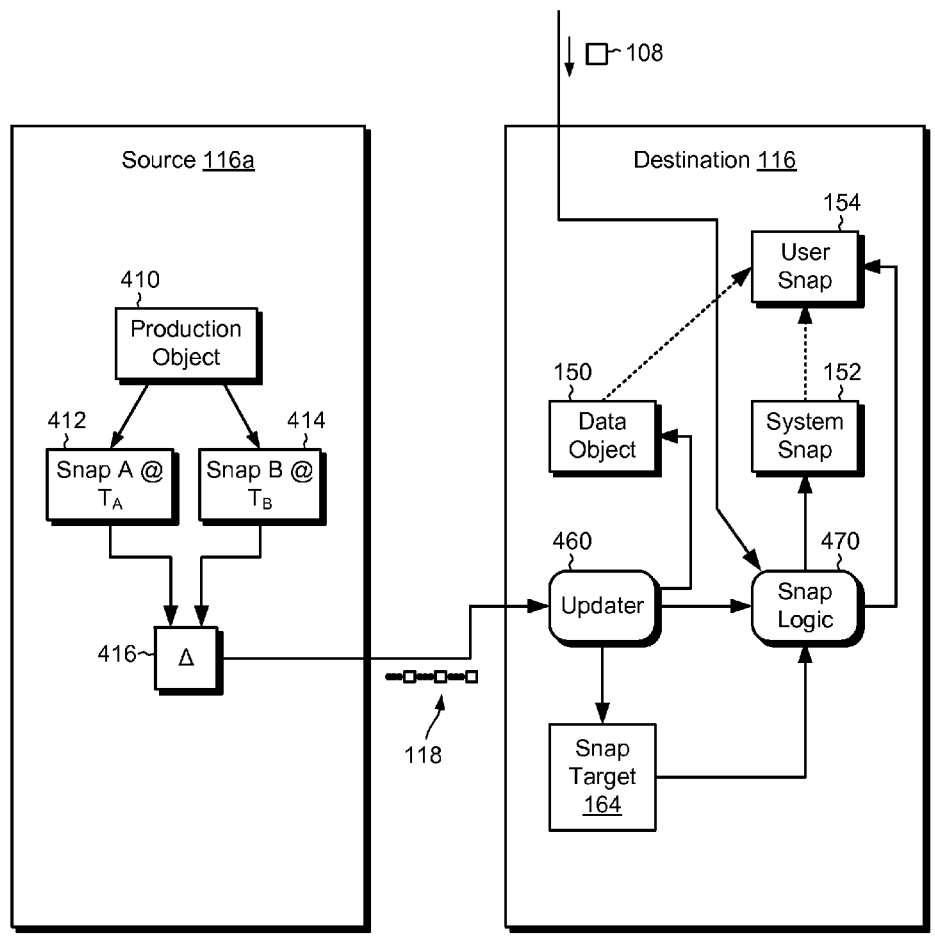
FIG. 4 is a block diagram showing example source and destination data storage systems conducting snapshot-shipping replication.

FIG. 4 shows an example snapshot-shipping arrangement. Here, a source data storage system 116a stores a host-accessible production object 410 (e.g., a LUN, host file system, VVol, etc.). Hosts may access the production object 410 from the source 116a for reading and writing, such that the production object 410 changes over time. It is assumed in this example that a replication session has been established for the production object 410, which employs snapshot-shipping to maintain a replica of the production object 410 at the destination data storage system 116. It is further assumed in this example that the destination data storage system 116 is the same data storage system 116 as shown in FIG. 1, and that the replica of the production object 410 is the same data object 150 as shown in FIG. 1.

To keep the data object 150 approximately current with the production object 410 as the production object changes in response to host IOs, the source data storage system 116a generates multiple snapshot-shipping updates 118 over time and sends the updates 118, one at a time, to the destination 116. To generate each snapshot-shipping update 118, the source 116a takes a snap 414 (Snap B) of the production object 410 at Time B (the current time) and compares Snap B with another snap 412 (Snap A) taken at Time A (the time the previous update 118 was prepared). A difference operator 416 identifies changes between the snaps 412 and 414. In an example, the difference operator 416 expresses the changes as a list of block locations and respective block values. The source 116a then sends the changes in the snapshot-shipping update 118 to the destination 116.

At the destination 116, an updater 460, e.g., running within the local orchestration 132, receives the snapshot-shipping update 118 and detects the beginning of processing the snapshot-shipping update 118. In response to this detection, the updater 460 sets the snap target 164 for the data object 150 to identify the system snap 152 as the object of user snap requests, and proceeds to begin applying the changes specified in the update 118 to the data object 150 (i.e., to the base file 336(1)—see FIG. 3). If a request 108 to take a user snap arrives while the updater 460 is updating the data object 150, snap logic 470 (also within local orchestration 132) checks the snap target 164, which identifies the system snap 152, and proceeds to take the user snap 154 of the identified object, i.e., the system snap 152 (file 336(2)). Upon the updater 460 completing the update 118 to the data object 150, the updater 460 detects completion and, in response to this detection, sets the snap target 164 to identify the data object 150 and directs the snap logic 470 to take a new system snap of the newly updated data object 150, such that the new system snap becomes the system snap 152. In an example, the new system snap 152 replaces the previous system snap 152, which may be destroyed to conserve space. If a request 108 for a user snap arrives at this point, the snap logic 470 again checks the snap target 164, which now identifies the data object 150, and the snap logic 470 takes the user snap from the identified object, i.e., directly from the data object 150 (file 336(1)).

Figure 5:
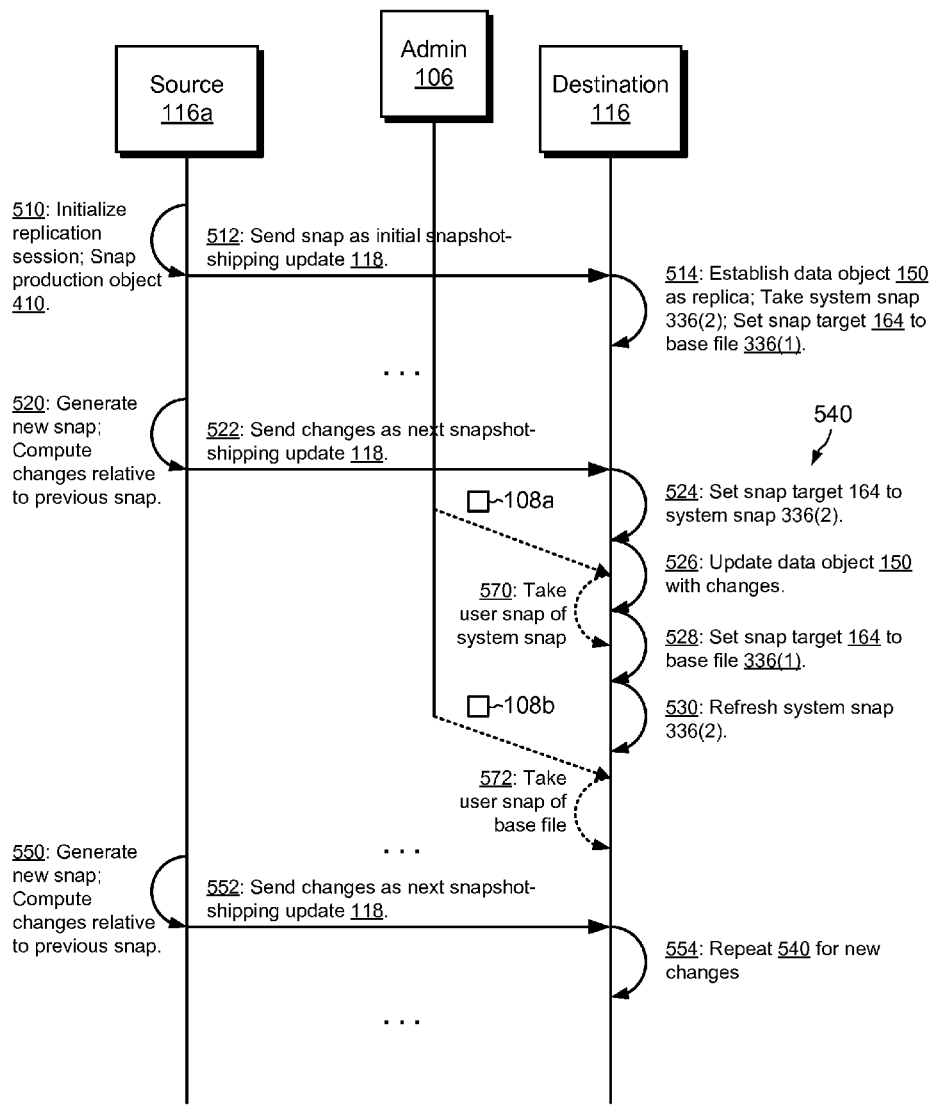
FIG. 5 is a sequence diagram showing an example process for responding to requests for user snaps in the course of processing multiple snapshot-shipping updates.

FIG. 5 shows an example sequence for performing multiple snapshot-shipping updates on the production object 410, where a request 108 to create a user snap may arrive at any time.

At 510, source 116a initializes replication and takes an initial snap of the production object 410.

At 512, the source 116a sends the initial snap to the destination 116 as an initial snapshot-shipping update 118.

At 514, the destination 116a establishes the data object 150 as a replica of the production object 410 and takes an initial system snap 152 (e.g., first snap file 336(2)). At this time, the destination 116 also sets the snap target 164 to identify the data object 150 (e.g., the base file 336(1)) as the object of user snap requests.

Sometime later, e.g., after the production object 410 has accumulated changes in response to continuing to process host IOs, the source 116a may generate another snapshot-shipping update 118.

At 520, the source 116a generates a new snap and computes a new set of changes relative to the previous snap.

At 522, the source 116a sends the computed changes in another snapshot-shipping update 118 to the destination 116.

At 540, the destination 116 performs a series of steps, 524, 526, 528, and 530. For example, at step 524 the destination 116 sets the snap target 164 to the system snap 152 (file 336(2)). At 526, the destination 116 updates the data object 150 (file 336(1)) to incorporate the new changes arriving with the most recent snapshot-shipping update 118. At 528, once the changes have been applied, the destination 116 sets the snap target 164 back to the data object 150 (base file 336(1)). At 530, the destination 116 refreshes the system snap 152 (file 336(2)). For example, the destination 116 takes a new system snap 152 and replaces the previous system snap 152 with the new one.

Sometime later, after yet more changes have been made to the production object 410, the source 116 generates yet another snap and computes the changes relative to the previous snap (step 550). At step 552, another snapshot-shipping update 118 is sent to the destination 116, and at 554 the series of steps 540 is repeated for incorporating the new updates. These events can be repeated indefinitely for generating and processing new snapshot-shipping updates 118.

As these replication activities ensue, the destination 116 may receive a request 108 to create a user snap at any time.

In one example, a request 108a arrives during the sequence 540, i.e., while the destination 116 is in the process of applying a snapshot-shipping update 118. In this scenario, as indicated at step 570, the destination 116 generates the user snap 154 as a snap of the system snap 152 (i.e., from file 336(2)), in accordance with the settings of the snap target 164, which identifies the system snap 152 as the object of user snap requests. In another example, a request 108b arrives between snapshot-shipping updates 118. In this scenario, as indicated at step 572, the destination 116 generates the user snap 154 as a snap of the data object 150 (from file 336(1)), in accordance with the settings of the snap target 164, which identifies the data object 150 as the object of user snap requests.

Figure 6:
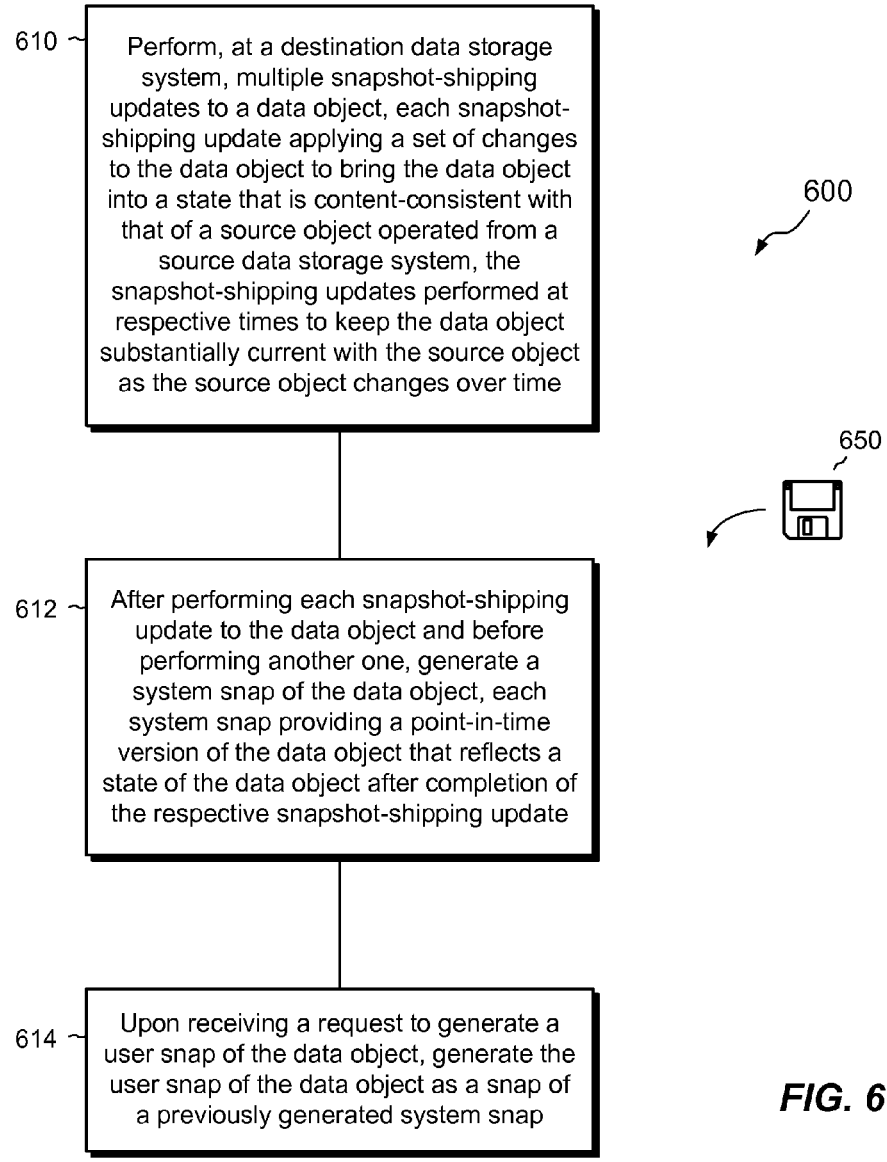
FIG. 6 is a flowchart an example process for generating snaps in a data storage system.

FIG. 6 shows an example process 600 that may be carried out in connection with the data storage system 116 and provides a summary of many activities described above. The process 600 is typically carried out by the software constructs, described in connection with FIGS. 1-4, which reside in the memory 130 of the storage processor 120 and are run by the set of processing units 124.

At 610, multiple snapshot-shipping updates to a data object are performed at a destination data storage system. Each snapshot-shipping update applies a set of changes to the data object to bring the data object into a state that is content-consistent with that of a source object operated from a source data storage system. The snapshot-shipping updates are performed at respective times to keep the data object substantially current with the source object as the source object changes over time. For example, multiple snapshot-shipping updates 118 to data object 150 are performed in data storage system 116 (FIG. 1). Different snapshot-shipping updates 118 are performed over time and bring the data object 150 into content-consistent state with that of a production object 410 (FIG. 4), which may be accessed by hosts such that its contents change over time.

At 612, after performing each snapshot-shipping update to the data object and before performing another one, a system snap of the data object is generated. Each system snap provides a point-in-time version of the data object that reflects a state of the data object after completion of the respective snapshot-shipping update. For example, after the data storage system 116 applies each snapshot-shipping update 118, the data storage system 116 takes a system snap 152 of the data object 150. The system snap 152 remains consistent even as the data object 150 changes in response to any later-received snapshot-shipping update 118.

At 614, upon receiving a request to generate a user snap of the data object, a user snap of the data object is generated as a snap of a previously generated system snap. For example, upon receiving a request 108 from an administrator, the data storage system 116 takes a user snap 154 of the system snap 152. In other examples, the data storage system 116 may take a user snap of the data object 150 directly, based on the value of the snap target 164 (FIGS. 1 and 4).

Having described certain embodiments, numerous alternative embodiments or variations can be made. For example, although Celerra Replicator™ V2 has been presented as one example of a technology for snapshot-shipping replication, the inventive concepts disclosed herein are not limited to use with Celerra Replicator™ V2 or to any particular product, but rather may be used with any snapshot-shipping replication technology.

Also, although certain types of snaps have been disclosed herein, the invention should not be construed as being limited to those types of snaps. Rather, the invention hereof is intended to apply to snaps or copies of any kind.

Further, although it has been shown and described that the destination data storage system 116 retains a single, most current system snap, which may serve as a target of redirection in response to request for user snaps, while destroying older system snaps, this is merely an example. Alternatively, the destination data storage system 116 may retain any number of system snaps, and may redirect snap requests to system snaps other than the most recent one.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any necessary ordering or sequence. Thus, for example, a second event may take place before or after a first event, or even if no first event ever occurs. In addition, an identification herein of a particular element, feature, or act as a "first" such element, feature, or act should not be construed as requiring that there also must be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method for generating snaps in a data storage system, the method comprising:

performing, at a destination data storage system, multiple snapshot-shipping updates to a data object, each snapshot-shipping update applying a set of changes to the data object to bring the data object into a state that is content-consistent with that of a source object operated from a source data storage system, the snapshot-shipping updates performed at respective times to keep the data object substantially current with the source object as the source object changes over time;

after performing each snapshot-shipping update to the
data object and before performing another one, generating a system snap of the data object, each system snap providing a point-in-time version of the data object that reflects a state of the data object after completion of the respective snapshot-shipping update;
upon receiving a request to generate a user snap of the data object, generating the user snap of the data object as a snap of a previously generated system snap;
receiving a second request to generate a second user snap of the data object; and
in response to the destination data storage system not being in a process of performing any of the snapshot-shipping updates when the second request is received, generating the second user snap as a snap of the data object,
wherein generating the user snap as the snap of the previously generated system snap is performed in response to the destination data storage system being in the process of performing one of the snapshot-shipping updates when the request to generate the user snap is received, and
wherein the method further comprises:
providing a snap target indicator in the destination data storage system, the snap target indicator identifying a current source to be used for taking user snaps in the destination data storage system;
setting the snap target indicator to a first value while each of a set of snapshot-shipping operations is taking place; and
setting the snap target indicator to a second value during periods between consecutive ones of the set of snapshot-shipping operations, the first value identifying a system snap as the source for taking user snaps, the second value identifying the data object as the source for taking user snaps; and
in response to requests to generate user snaps of the data object, (i) checking the snap target indicator and (ii) generating snaps of the source identified by the snap target indicator.

2. The method of claim 1, wherein the data object is realized in a base file stored in a file system of the destination data storage system, wherein each system snap is a snap of the base file and each system snap is itself a file in the file system, and wherein the user snap and the second user snap are each files in the file system.

3. The method of claim 2, further comprising, after taking each system snap of the data object, destroying any previously-taken system snap of the data object from the file system.

4. The method of claim 2, further comprising:
storing, by the destination data storage system, the snap target indicator to identify a file to be snapped in response to receiving requests to generate snaps of the data object,
wherein generating the user snap includes interrogating the snap target indicator and identifying, from the snap target indicator, the file to be snapped as a system snap file, and
wherein generating the second user snap includes interrogating the snap target indicator and identifying, from the snap target indicator, the file to be snapped as the base file.

5. The method of claim 4, wherein each snapshot-shipping update has a beginning and an end, and wherein the method further comprises:

detecting the beginning of a snapshot-shipping update on the base file; and
in response to detecting the beginning of the snapshot-shipping update on the base file, setting the snap target indicator to identify a system snap file as the file to be snapped.

6. The method of claim 5, wherein the method further comprises:
detecting the end of a snapshot-shipping update on the base file; and
in response to detecting the end of the snapshot-shipping update on the base file, setting the snap target indicator to identify the base file as the file to be snapped.

7. The method of claim 6, wherein the base file provides a file-based realization of one of (i) a LUN, (ii) a file system, or (iii) a VVol (Virtual Volume).

8. The method of claim 1, wherein the destination data storage system includes an updater running within a storage processor of the destination data storage system, and wherein the method further comprises:
the updater detecting a beginning of processing a snapshot-shipping update received from the source data storage system;
in response to the updater detecting the beginning of processing the snapshot-shipping update, setting, by the updater, the snap target indicator to identify a system snap as a target of user snap requests, such that a request for a user snap arriving when the snap target indicator identifies the system snap causes the storage processor to generate the user snap from the system snap; and
in response to the updater detecting an end of processing the snapshot-shipping update, setting, by the updater, the snap target indicator to identify the data object as the target of user snap requests, such that a request for a user snap arriving when the snap target indicator identifies the data object causes the storage processor to generate the user snap from the data object.

9. A data storage system, comprising control circuitry that includes a set of processing units coupled to memory, the control circuitry constructed and arranged to:
perform, at a destination data storage system, multiple snapshot-shipping updates to a data object, each snapshot-shipping update applying a set of changes to the data object to bring the data object into a state that is content-consistent with that of a source object operated from a source data storage system, the snapshot-shipping updates performed at respective times to keep the data object substantially current with the source object as the source object changes over time;
after performing each snapshot-shipping update to the data object and before performing another one, generate a system snap of the data object, each system snap providing a point-in-time version of the data object that reflects a state of the data object after completion of the respective snapshot-shipping update;
upon receiving a request to generate a user snap of the data object, generate the user snap of the data object as a snap of a previously generated system snap;
receive a second request to generate a second user snap of the data object; and
in response to the destination data storage system not being in a process of performing any of the snapshot-shipping updates when the second request is received, generate the second user snap as a snap of the data object, wherein the control circuitry is constructed and arranged to generate the user snap as the snap of the previously generated system snap in response to the destination data storage system being in the process of performing one of the snapshot-shipping updates when the request to generate the user snap is received, and wherein the control circuitry is further constructed and arranged to:

provide a snap target indicator in the destination data storage system, the snap target indicator identifying a current source to be used for taking user snaps in the destination data storage system;

set the snap target to a first value while each of a set of snapshot-shipping operations is taking place; and set the snap target to a second value during periods between consecutive ones of the set of snapshot-shipping operations, the first value identifying a system snap as the source for taking user snaps, the second value identifying the data object as the source for taking user snaps; and in response to requests to generate user snaps of the data object, (i) check the snap target and (ii) generate snaps of the source identified by the snap target.

10. The data storage system of claim 9, wherein the memory is constructed and arranged to (i) store the file system including multiple files, (ii) realize the data object and snaps thereof in respective files of the file system, and (iii) store the snap target indicator to identify a file in the file system to be snapped in response to receiving requests to generate snaps of the data object, wherein each snapshot-shipping update has a beginning and an end and wherein the control circuitry is further constructed and arranged to:

detect the beginning of each snapshot-shipping update on the base file;

in response to detecting the beginning of each snapshot-shipping update on the base file, set the snap target indicator to identify a system snap file as the file to be snapped;

detect the end of each snapshot-shipping update on the base file;

in response to detecting the end of each snapshot-shipping update on the base file, set the snap target indicator to identify the base file as the file to be snapped; and in response to receiving each of multiple requests to generate a snap of the data object, (a) interrogate the snap target indicator, (b) identify, from the snap target indicator, the file to be snapped and (c) take a snap of the file identified in the snap target indicator.

11. The data storage system of claim 10, wherein the base file provides a file-based realization of one of (i) a LUN, (ii) a file system, or (iii) a VVol (Virtual Volume).

12. A computer-program product including a set of non-transitory, computer-readable media including instructions which, when executed by a set of processing units of a destination data storage system, cause the set of processing units to perform a method for generating snaps, the method comprising:

performing, at a destination data storage system, multiple snapshot-shipping updates to a data object, each snapshot-shipping update applying a set of changes to the data object to bring the data object into a state that is content-consistent with that of a source object operated from a source data storage system, the snapshot-shipping updates performed at respective times to keep the data object substantially current with the source object as the source object changes over time;

after performing each snapshot-shipping update to the data object and before performing another one, generating a system snap of the data object, each system snap providing a point-in-time version of the data object that reflects a state of the data object after completion of the respective snapshot-shipping update; and upon receiving a request to generate a user snap of the data object, generating the user snap of the data object as a snap of a previously generated system snap;

receiving a second request to generate a second user snap of the data object; and in response to the destination data storage system not being in a process of performing any of the snapshot-shipping updates when the second request is received, generating the second user snap as a snap of the data object, wherein generating the user snap as the snap of the previously generated system snap is performed in response to the destination data storage system being in the process of performing one of the snapshot-shipping updates when the request to generate the user snap is received, and wherein the method further comprises:

providing a snap target indicator in the destination data storage system, the snap target indicator identifying a current source to be used for taking user snaps in the destination data storage system;

setting the snap target to a first value while each of a set of snapshot-shipping operations is taking place; and setting the snap target to a second value during periods between consecutive ones of the set of snapshot-shipping operations, the first value identifying a system snap as the source for taking user snaps, the second value identifying the data object as the source for taking user snaps; and in response to requests to generate user snaps of the data object, (i) checking the snap target and (ii) generating snaps of the source identified by the snap target.

13. The computer program product of claim 12, wherein the data object is realized in a base file stored in a file system of the destination data storage system, wherein each system snap is a snap of the base file and each system snap is itself a file in the file system, and wherein the user snap and the second user snap are each files in the file system.

14. The computer program product of claim 13, wherein the method further comprises, after taking each system snap of the data object, destroying any previously-taken system snap of the data object from the file system.

15. The computer program product of claim 13, wherein the method further comprises:

storing, by the destination data storage system, the snap target indicator to identify a file to be snapped in response to receiving requests to generate snaps of the data object, wherein generating the user snap includes interrogating the snap target indicator and identifying, from the snap target indicator, the file to be snapped as a system snap file;

wherein generating the second user snap includes interrogating the snap target indicator and identifying, from the snap target indicator, the file to be snapped as the base file.

16. The computer program product of claim 15, wherein each snapshot-shipping update has a beginning and an end, and wherein the method further comprises:
- detecting the beginning of each snapshot-shipping update on the base file;
- in response to detecting the beginning of each snapshot-shipping update on the base file, setting the snap target indicator to identify a system snap file as the file to be snapped;
- detecting the end of each snapshot-shipping update on the base file;
- in response to detecting the end of each snapshot-shipping update on the base file, setting the snap target indicator to identify the base file as the file to be snapped; and
- in response to receiving each of multiple requests to generate a snap of the data object, (a) interrogating the snap target indicator, (b) identifying, from the snap target indicator, the file to be snapped and (c) taking a snap of the file identified in the snap target indicator.

17. The computer program produce of claim 16, wherein the base file provides a file-based realization of one of (i) a LUN, (ii) a file system, or (iii) a VVol (Virtual Volume).

\* \* \* \* \*